June 2, 1970  EIZO GOTO  3,515,530
PROCESS FOR SEALING METAL BODY TO GLASS BODY
Filed May 29, 1967  2 Sheets-Sheet 1

BY Eizo Goto
INVENTOR.
Kenron, Palmer, Stewart
& Estabrook

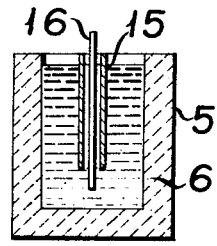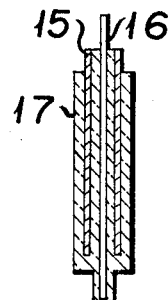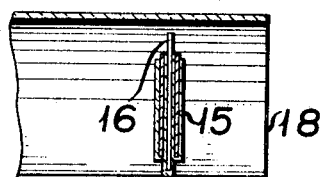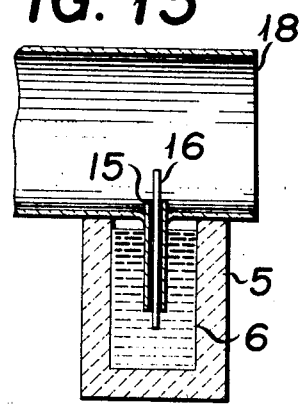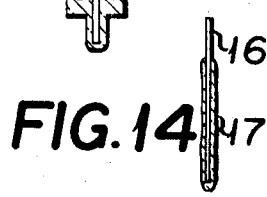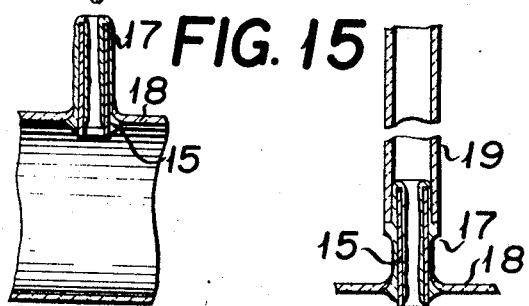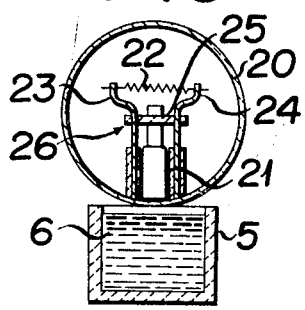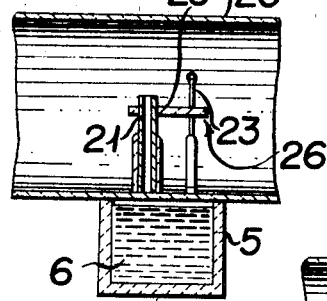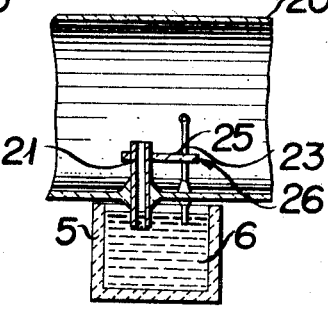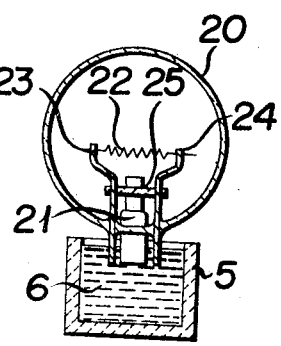

United States Patent Office 3,515,530
Patented June 2, 1970

3,515,530
PROCESS FOR SEALING METAL
BODY TO GLASS BODY
Eizo Goto, Chigasaki-shi, Japan, assignor to Tokyo Shibaura Electric Co., Ltd., Kawasaki-shi, Japan, a corporation of Japan
Filed May 29, 1967, Ser. No. 642,022
Claims priority, application Japan, June 1, 1966,
41/34,760, 41/34,761, 41/34,762; Sept. 21, 1966,
41/61,893
Int. Cl. C03c 27/04, 27/02; C03b 23/26
U.S. Cl. 65—43         8 Claims

ABSTRACT OF THE DISCLOSURE

A metal body is sealed to a glass body by positioning a glass body adjacent a bath of molten glass so as to soften the glass body locally by the radiated heat from the bath. Pressing the metal body to be sealed to said glass body on the softened part of said glass body in such a manner that said metal body can penetrate through said glass body, to immerse at least a part of said metal body penetrated through said glass body in said molten glass bath so that the part of said glass body contacted with said metal body can be sealed thereto by the heat conducted through said metal body.

BACKGROUND OF THE INVENTION

This invention relates to sealing a metal body to a glass body by means of the melted and solidified glass, more particularly to a process for sealing said metal body to said glass body in such a manner that said metal body penetrates through said glass body and that a glass film is formed on the surface of said metal body which has penetrated through said glass body.

In assembling electric tubes or bulbs it is often required to seal a metal body such as a metal wire or tube to a glass body in such a manner that said metal body penetrates through said glass body. Such sealing is generally carried out by first boring that part of said glass body to which said metal body is to be sealed using burner flames, holding the metal body which has penetrated through said hole in the prescribed position and thereafter melting the glass around said hole using the burner flames again so as to join said metal body and glass body together. However, heating by burner flames presents difficulties in concentrating heat on the desired restricted region, so that the glass body and/or the metal body are heated over an unnecessarily broad area and also a long time is required in sealing. Where high-frequency heating is employed as a heat source, it is indeed possible locally to heat the seal portion in a short time. However, the means of supplying a high-frequency current used in induced heating imposes various restrictions on the material and shape of a body to be heated and moreover requires considerable equipment.

One of the known methods of sealing a metal body to a glass body so as to penetrate therethrough consists in contacting one end of the metal body to be sealed with the prescribed part of said glass body, heating said metal body by burner flames at a point apart from said glass body, conducting heat so as to soften that part of said glass body which is contacted with said one end of the metal body thus heated and at this time pressing said metal body into said glass body so as to penetrate therethrough. Although this method eliminates the previous boring of a glass body, and has the advantage of simplifying operation, its drawback is that the sealed part is mechanically weak. This lack of mechanical strength is deemed to arise from the fact that in the sealed part of the glass body, a conical depression is formed on that side of the glass body where the metal body is pressed in, thus considerably reducing the glass thickness at this point, namely, that the metal body is only supported by the end of a thin conical part of said glass body. The sealed part having so reduced mechanical strength is liable to be destroyed easily by the causes such as slight shocks which might otherwise have no serious effect.

SUMMARY OF THE INVENTION

This invention comprises holding a glass body above a bath of molten glass, heating said glass body by the heat radiated therefrom so as to soften it, pressing a metal body to be sealed into said glass body thus softened in such a manner that it penetrates through said glass body and immersing one end of the metal body which has penetrated through said glass body in said molten glass bath.

The metal body which has penetrated through the glass body and one end of which is immersed in said molten glass bath absorbs the heat of said glass bath heated to elevated temperatures. Through said metal body the heat is conducted to the glass body so as to heat particularly the seal portion of said glass body to higher temperatures, thereby ensuring a close attachment between said seal portion of the glass body and the circumference of the metal body. At the same time, on that part of the metal body which has been immersed in said molten glass bath is formed a glass layer by the deposition of a part of said molten glass bath. The glass layer serves the purpose of permitting the easy attachment of other glass bodies to said metal body and furthermore ensuring the reinforcement and protection from oxidation of said metal body.

BRIEF DESCRIPTION OF THE DRAWINGS

FIGS. 10 to 15 are similar views showing the processes of another embodiment of this invention; and FIGS. 16 to 19 are similar views showing the processes of a further embodiment of this invention.

DESCRIPTION OF THE PREFERRED EMBODIMENTS

Figure 1:
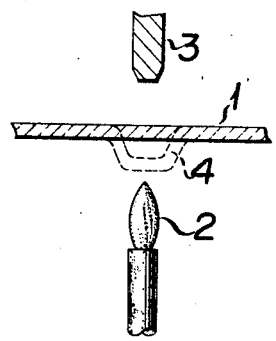
FIGS. 1 to 4 are longitudinal cross sectional views showing the processes whereby a metal body is sealed to a glass body according to one embodiment of this invention.
Figure 2:
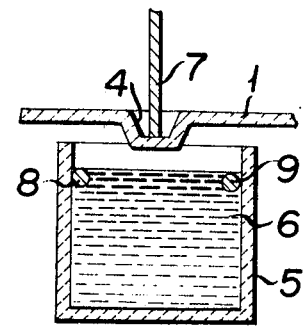

Referring now to the accompanying drawings in which the same or similar parts are indicated by the same reference numerals.

In FIG. 1, the seal portion of a glass plate 1 is softened in advance, for example, by burner flames 2 and thereafter depression 4 (shown by dotted lines) is formed at said portion by pressing die 3. Said glass plate 1 thus depressed is held above a bath of molten glass contained in a vessel 5 made of refractory material and a metal body such as metal wire 7 is positioned almost perpendicular to the plane of the glass plate 1 by means of a proper jig (not shown) in such a manner that one end of said metal body comes in contact with the bottom of said depression 4.

The glass bath 6 consists of glass such as borosilicate glass containing lead oxide which melts at relatively low temperatures. Said bath is heated by an electric current flowed across a pair of bar electrodes 8 and 9 installed within vessel 5 in an opposite relation to each other with said glass bath lying therebetween to the temperatures at which the viscosity of the surface portion of said glass bath is maintained at less than 100 poises, more preferably less than 50 poises. Generally speaking, when glass is heated to temperatures of more than 500° C. its electric resistance rapidly decreases, so that when an electric current is flowed through the glass tube heated, it can be easily heated to high temperatures such as 1300 to 1500° C. due to its Joule heat. At such higher temperatures, the glass displays the aforementioned low viscosity.

The glass plate 1 held above glass bath 6 heated to the high temperatures, particularly part 4 thereof protruding downward, is easily heated by the radiated heat from the surface of said glass bath 6 to the temperatures at which the glass can be deformed upon the application of a force.

Figure 3:
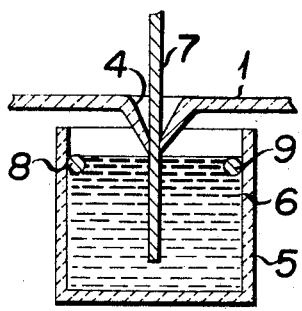

When the seal portion 4 of said glass plate 1 reaches its softening point metal wire 7 is pressed downward in such a manner that it penetrates through the bottom of depression 4 of said glass plate 1, and a part or the major part of said metal wire 7 is immersed in molten glass bath 6 as shown in FIG. 3. The part of said metal wire 7 which has been immersed in said molten glass bath 6 receives heat from said bath, and the heat is conducted through the metal wire 7 to the part of said glass plate 1 which has already been softened and is contacted with said metal wire 7. The seal portion 4 of said glass plate 1 may be easily heated by the heat thus conducted to temperatures, for example, about 1000° C. at which it displays high fluidity. Due to such high fluidity, the glass of said seal portion 4 is closely attached to the circumference of the metal wire 7. The length of time said metal wire is immersed in said glass bath in order to complete sealing is usually about 2 seconds.

Figure 4:
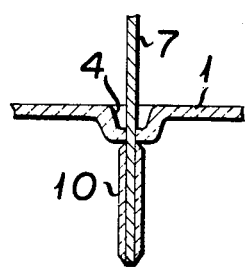

Thereafter said glass plate 1 and metal wire 7 thus sealed are removed from said molten glass bath 6 with given relative positions therebetween, and cooled to the temperature at which the glass solidifies, and then taken off from the jig. For the cooling, the conditions for annealing may be adopted, if required, in order to eliminate the occurrence of strains within the glass. As shown in FIG. 4, the sealed article, namely the metal wire 7 sealed to the glass plate 1 so as to penetrate therethrough is firmly and closely attached to the thick seal portion of said glass plate 1 so that the assembly as a whole has a sufficient mechanical strength. Further, the part of the metal wire 7 which was immersed in the molten glass bath 6 is coated with this glass layer 10 which was formed due to the deposition and solidification of a part of the molten glass. The presence of said glass layer 10 mechanically reinforces the metal wire 7 and also protects it from oxidation. Furthermore, said glass layer 10 offers great advantages in meeting the demand to seal other glass bodies to the metal wire 7.

Figure 5:
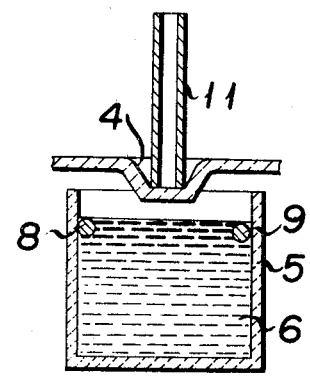
FIGS. 5 to 7 are similar views showing the processes of another embodiment according to this invention.
Figure 6:
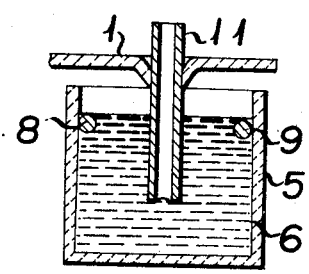
Figure 7:
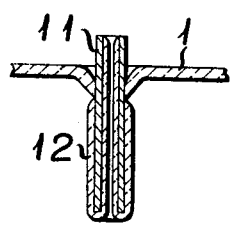

FIGS. 5 to 7 show the processes of another embodiment according to this invention wherein a metal sleeve is sealed to a glass plate so as to penetrate therethrough. In FIG. 5, the glass plate 1 has depression 4 provided at its seal portion as in the preceding embodiment and a sleeve 11 is set in such a manner that it stands upright from within said depression 4. The glass plate 1 is placed above said molten glass bath 6 contained in a vessel 5 having a square opening each side of which is 25 mm. long and depth of 20 mm. Said glass bath 6 consists of glass (softening point being 520° C.) which is composed of $SiO_2$, $B_2O_3$ and PbO as indispensable ingredients. Said glass bath 6 is heated to a temperature of about 1300° C. by an electric energy of current flow, for example, of about 50 volts, 10 amperes which is flowed across a pair of heat resist conductive material such as molybdenum or tungsten electrodes 8 and 9 arranged in an opposite relation to each other within the vessel 5. At this temperature range said glass bath has a viscosity of about 40 poises.

As in the preceding embodiment, the glass plate 1 placed above said glass bath 6 is softened by the heat radiated therefrom. When said glass plate 1 is softened said sleeve 11 is pressed downward in such a manner that it penetrates therethrough and that its lower end is immersed in said glass bath 6. After being kept under such condition, for a short period of time, the glass plate 1 and the sleeve 11 are removed from said glass bath 6 and then cooled. As shown in FIG. 7, in the assembly thus sealed, the metal sleeve 11 is firmly attached to the prescribed part of the glass plate 1, and the part of said sleeve 11 which was immersed in said glass bath 6 is coated with a thin glass layer 12 formed due to the deposition of a part of said glass bath 6.

Where a sleeve to be sealed in this embodiment has a relatively small inner diameter, the glass deposited on the inside thereof will stop up the sleeve. In such a case, if a heated bar member, for example, of carbon, molybdenum or tungsten is inserted through the sleeve, the glass plugging the sleeve may easily be removed.

Figure 8:
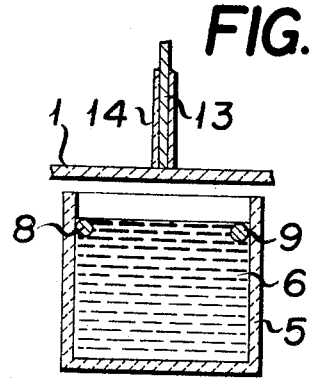
FIGS. 8 and 9 are similar views showing the processes of another embodiment of this invention.
Figure 9:
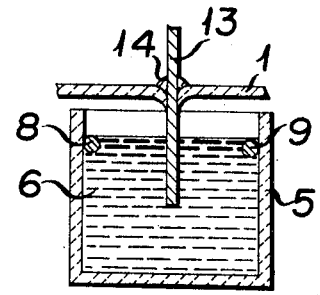

FIGS. 8 and 9 represent the processes of another embodiment of the invention adapted to complete a seal having an excellent mechanical strength. In this embodiment a metal wire 13 to be sealed is placed above a glass plate 1 in an almost upright position and has part of its outer surface covered with a glass layer 14 which has a softening point lower than that of said glass plate 1. When said glass plate 1 is heated to its softening point by the heat radiated from said molten glass bath 6, said glass layer 14 is already melted into a liquid having a sufficient fluidity at that temperature. When the metal wire 13 is pressed throughout glass plate 1, glass layer 14 thus melted, has an action like a lubricant for reducing friction between said metal wire and glass plate, so that said metal wire can be moved smoothly and also the deformation of said glass plate 1 at the point through which said metal wire 7 penetrates is minimized. Furthermore, said glass layer 14 thus melted fills up the depression formed on said glass plate 1 as shown in FIG. 9 when sealing has been completed, thereby accomplishing a stronger joint between said glass plate 1 and said metal wire 7 sealed thereto.

Other modifications of the process of this invention intended to seal a metal sleeve having a relatively small inner diameter to a glass plate without stopping up its bore include the operations illustrated in FIGS. 10 to 15. A thin metal wire 16 is inserted coaxially through the interior of a metal sleeve 15 to be sealed. An assembly of the metal sleeve 15 and the metal wire 16, except a part thereof, is immersed in a molten glass bath 6 as shown in FIG. 10 with desired relative positions and taken out of the bath after a certain length of time. This operation permits the formation of a glass layer 17 on the outer surface of metal sleeve 15 and in the space between the inner surface thereof and metal wire 16 (see FIG. 11). The metal sleeve 15 having the metal wire 16 and glass layer 17 is held at the seal portion of cylindrical glass body 18, which is then transferred above a vessel 5 in such a manner that said seal portion is brought right above the molten glass bath 6. When the seal portion of said glass body 18 has been softened by the heat radiated from said glass bath 6 as previously described, said sleeve 15 is pushed downward so as to penetrate through said glass body 18. When said sleeve 15 and metal wire 16 are pushed downward to the predetermined position the lower ends of both are immersed in the glass bath 6 as shown in FIG. 13, and the heat of said glass bath 6 melts the glass layer 17 formed on the circumference of the sleeve 15 and is also conducted through said sleeve 15 to raise the temperature of the seal portion of the glass body 18 so that said sleeve 15 and the glass body 18 are tightly joined together.

After said sleeve 15 and glass body 18 are attached closely to each other, they are removed from said glass bath 6 and cooled so as to solidify the glass part still in a softened or molten state. Then the metal wire 16 inserted throughout the sleeve 15 is heated by applying burner flames, for example, to the exposed part thereof, and pulled out from the sleeve 15. This operation produces within said sleeve 15 a bore interconnecting the inside and outside of said cylindrical glass body 18. When said metal wire 16 is pulled out, the sealed part between sleeve 15 and glass body 18 should preferably be cooled in order to avoid the deformation of said sealed part due to the heat generated by the application of the aforesaid burner flames to the exposed part of the metal wire 16.

Where it is required to connect another glass tube to said sleeve 15 which has been sealed to glass body 18, it can be carried out easily and quickly by melting the glass layer 17 deposited on the outer circumference of said sleeve 15 using an adequate means of heating, for example, the application of burner flames and inserting said sleeve 15 into said glass tube 19 which has an inner diameter large enough to fit said sleeve 15 therein. The joint thus obtained has a very high air-tightness and a great mechanical strength, because the free space between both the sleeve 15 and the glass tube 19 is completely filled up with said glass layer 17 thus melted.

The process of this invention can be applied for fitting a stem to a cylindrical glass body in a direction perpendicular to the axis thereof to obtain so-called $\pi$-shaped fluorescent lamps. As illustrated in FIGS. 16 and 17, at the predetermined position within a glass tube 20 for $\pi$-shaped fluorescent lamps is installed a stem 26 which comprises an exhaust tube 21, two lead-in wires 23 and 24 made, for example, of a Ni-Fe alloy to support a filament 22 and a glass button 25 to hold said exhaust tube 21 and lead-in wires 23 and 24 in the prescribed inter-relations. The lower half of both said exhaust tube 21 and said lead-in wires 23 and 24 should preferably be coated with a low-melting glass layer (not shown).

The glass tube 20 having said stem 26 is positioned near above the surface of a molten glass bath 6 contained in a vessel 5 and is softened by heat radiated from said bath. Thereafter, the ends of both the exhaust tube 21 and the lead-in wires 23 and 24 of said stem 26 are pushed downward in such a manner that said ends break through the side wall of the glass tube 20. Thus said exhaust tube 21 and the lead-in wires 23 and 24 penetrate through the side wall of said glass tube 20 into the molten glass bath 6 positioned below, and as a result, is heated by the heat of said glass bath 6, so that the tube 21 and the wires 23 and 24 are tightly attached to said glass tube 20 at the determined sealing portion. At the time of this joining, the aforesaid low-melting glass layer coated on said exhaust tube 21 and lead-in wires 23 and 24 are melted and collected at the joint, thus assuring a tight attachment between the stem 26 and the glass tube 20 and a high air-tightness at their joint.

With respect to a metal body to be sealed to a glass body according to the process of this invention, it is preferable to select the material which has as close a thermal expansion coefficient as possible to that of said glass body in order to accomplish a stable seal. The glass most commonly used in hermetically sealing a metal element such as borosilicate glass generally has a thermal expansion coefficient ranging from 70 to $100 \times 10^{-7}$ cm./° C. Consequently, metal materials having a thermal expansion coefficient falling within said range may include, for example, a Ni—Fe alloy containing 42 percent Ni, 6 percent Cr and Fe as the remainder, are very suitable to attain the purpose of this invention, but the selection in glass and metal materials will be clear to those skilled in the art.

As described above, the critical feature of this invention is that it offers a sealed body consisting of a glass body and a metal body that is sealed with great mechanical strength and high air-tightness. What is more important is that according to the process of this invention, sealing is carried out at a point right above a molten glass bath, so that a glass body to be sealed is subjected to no restrictions in respect of shape and size.

Furthermore, this invention enables good sealing to be accomplished by simpler operations than that of the conventional method, so that it is capable of being applied to a continuous process to obtain sealed bodies with constant quality.

While the invention has been described in connection with some preferred embodiments thereof, the invention is not limited thereto and includes any modifications and alternations which fall within the true spirit and scope of the invention as defined in the appended claims.

What is claimed is:

1. In a process for sealing a metal body to a glass body wherein a portion of the metal body penetrates through a wall portion of the glass body, the improvement which comprises:
   (a) positioning said metal body to be sealed to said glass body with said metal body portion at the seal portion of said glass body,
   (b) placing said seal portion of said glass body adjacent a molten glass bath in such manner that said portion is softened by heat radiated from said molten glass bath,
   (c) holding said seal portion as placed in step "b" for a time sufficient to allow said seal portion to soften sufficiently that said metal body portion can penetrate through the glass body without cracking or chipping,
   (d) pushing said metal body toward said glass body to penetrate said metal body portion through said seal portion of said glass body, and immerse said metal body portion in said molten glass bath,
   (e) holding said metal body portion immersed in said glass bath for a time sufficient to permit a sealing between said metal body and said glass body to be accomplished by conduction heating, and
   (f) removing the resulting assembly of metal body and glass body from said molten glass bath while maintaining the relative position of metal body and glass body fixed until the seal portion of said glass body is solidified by cooling.

2. A process as claimed in claim 1 further including the step of forming a depression in said glass body at said seal portion.

3. A process as claimed in claim 1 wherein said metal body is a wire.

4. A process as claimed in claim 1 wherein said metal body is a tube.

5. A process as claimed in claim 1 wherein said metal body is a tube with a metal wire coaxially inserted therethrough, and further including the step of pulling said metal wire out of said tube after step "e" and before the cooling of step "f."

6. A process as claimed in claim 1 wherein said glass body is a cylindrical glass tube for a lamp and said metal body is a stem for said lamp.

7. A process as claimed in claim 1 further including the step of forming on a surface of said metal body portion a layer of glass having a lower softening point than that of the glass of said glass body prior to said step "a."

8. A process as claimed in claim 1 further including the step of heating said molten glass bath to a temperature sufficient for the molten glass to have a viscosity less than 100 poises prior to said step "b."

References Cited

FOREIGN PATENTS 530,343  12/1940  Great Britain.

S. LEON BASHORE, Primary Examiner

S. R. FRIEDMAN, Assistant Examiner

U.S. Cl. X.R.

65—59, 105